Patented Mar. 27, 1923.

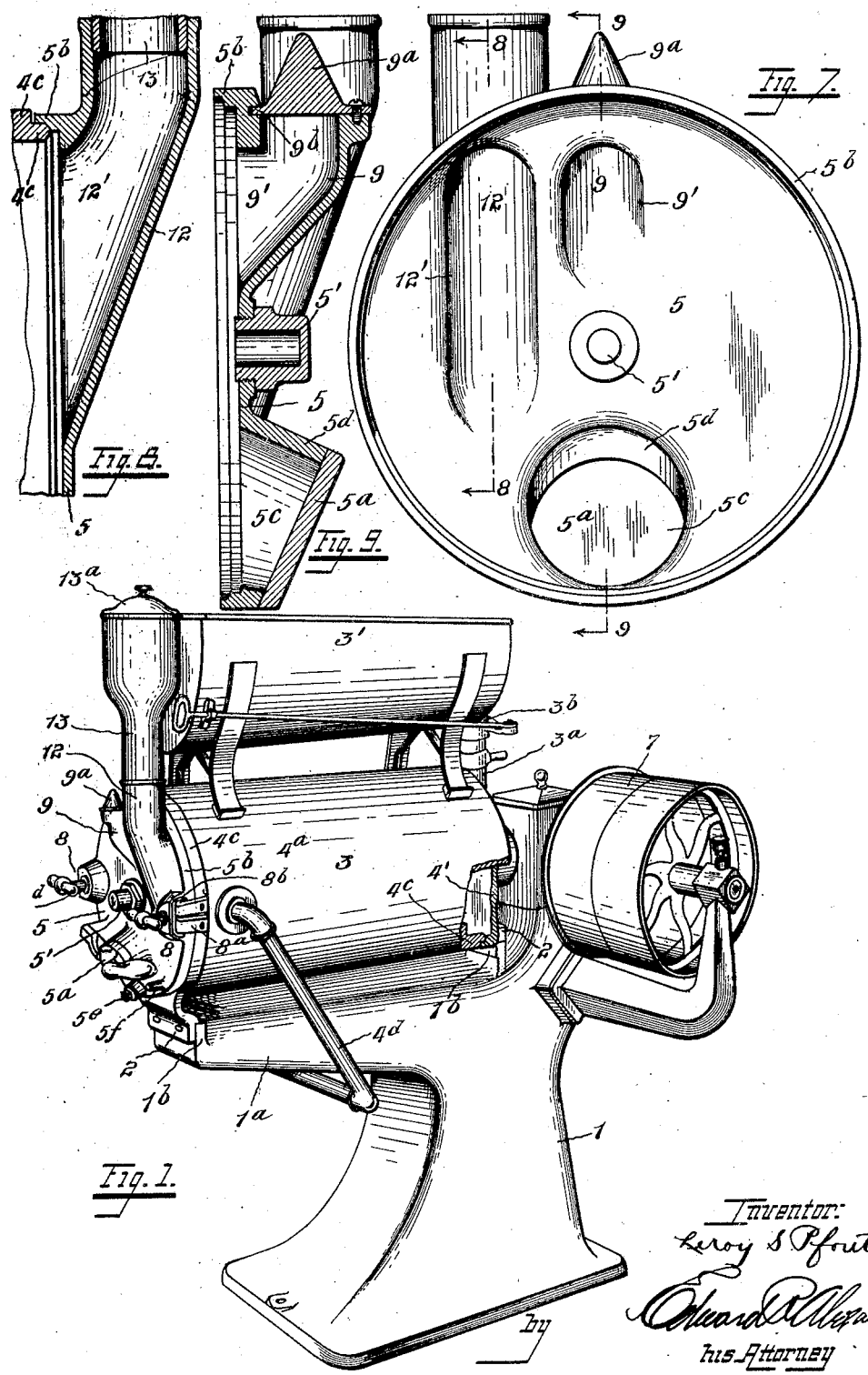

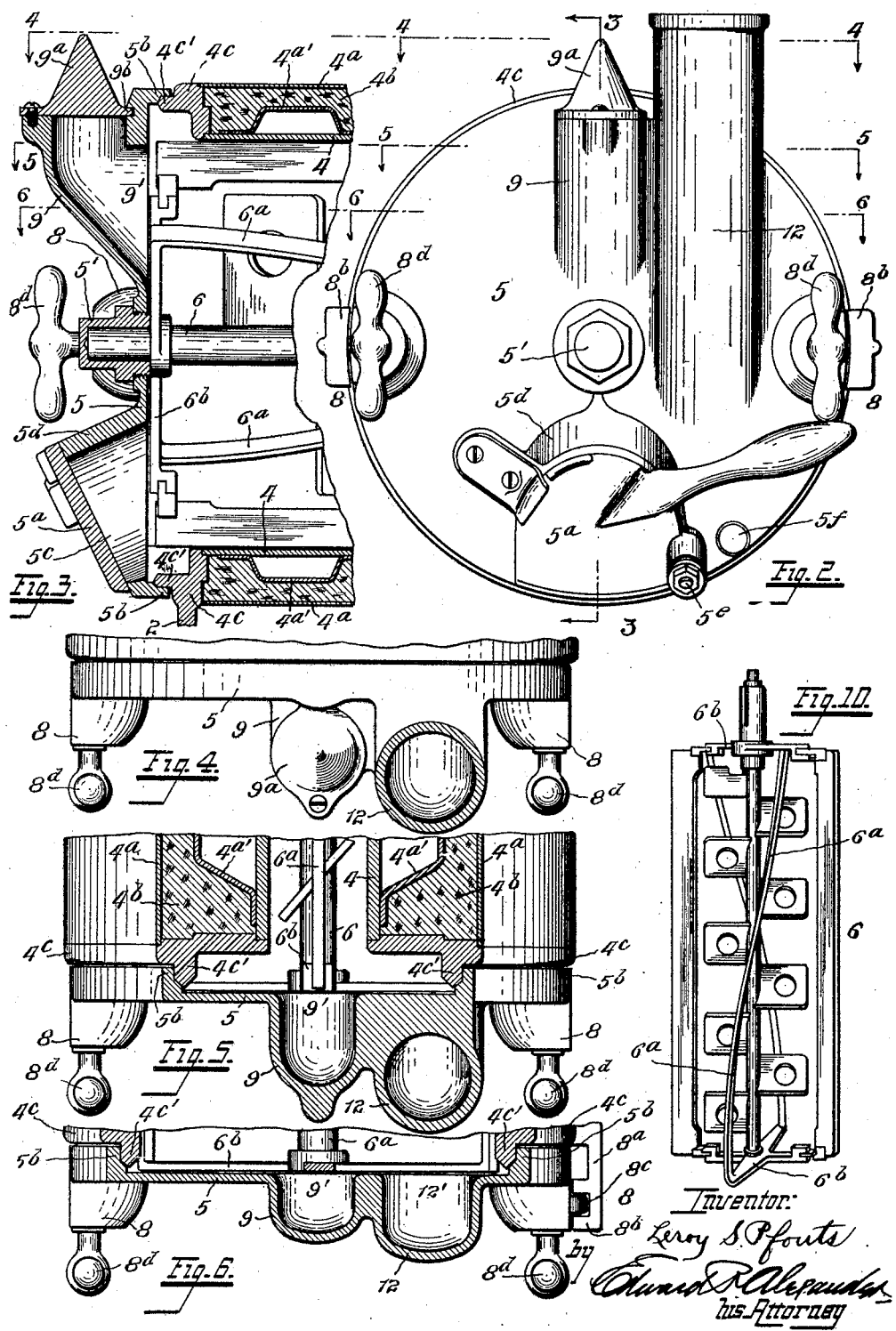

1,449,623

UNITED STATES PATENT OFFICE.

LEROY S. PFOUTS, OF CANTON, OHIO, ASSIGNOR, BY MESNE ASSIGNMENTS, TO THE H. H. MILLER INDUSTRIES COMPANY, OF CANTON, OHIO, A CORPORATION OF OHIO.

ICE-CREAM FREEZER.

Application filed August 26, 1916, Serial No. 116,969. Renewed July 6, 1922. Serial No. 573,191.

*To all whom it may concern:*

Be it known that I, LEROY S. PFOUTS, a citizen of the United States, residing at Canton, in the county of Stark and State of Ohio, have invented certain new and useful Improvements in and Relating to Ice-Cream Freezers, of which the following is a specification.

This invention relates to an ice cream freezer, more particularly to that type of ice cream freezer in which batches or charges of material to be frozen are successively delivered to and emptied from the freezer.

One object of the invention is to provide improved means for delivering fruit or flavoring material to the freezing chamber independently of the supply thereto of the material to be frozen.

Another object of the invention is to provide novel means for supplying fruit or flavoring to the freezing chamber in a manner which insures thorough mixing thereof with the material being frozen.

Another object of the invention is to provide a horizontal ice cream freezer one head of which is formed at one side of the axis of the freezer with a material inlet opening, which is so arranged relative to movement of the agitating and scraping mechanism that material, such as fruit, introduced into the freezer will become readily mixed therein without being cut up or crushed.

Another object of the invention is to provide an improved ice cream freezer head having three openings, one of which serves as a discharge opening, and another of which serves as an inlet opening, which permits fruit or other material to be introduced directly to the freezing chamber.

Other objects of the invention will be apparent to those skilled in the art to which my invention relates from the following description taken in connection with the accompanying drawings.

For the purpose of illustration, I have, in the accompanying drawings shown and herein described one form of apparatus embodying my invention.

In the drawings,

Fig. 1 is a perspective view of a freezing apparatus embodying my invention, parts being broken away.

Fig. 2 is a front elevation of the freezing apparatus, the batch holding tank and supporting members for the freezer being omitted.

Fig. 3 is a fragmentary section on the line 3—3 of Fig. 2.

Fig. 4 is a section on the line 4—4 of Figs. 2 and 3.

Fig. 5 is a section on the line 5—5 of Figs. 2 and 3.

Fig. 6 is a section on the line 6—6 of Figs. 2 and 3.

Fig. 7 is a rear elevation of the freezer front head.

Fig. 8 is a section on the line 8—8 of Fig. 7.

Fig. 9 is a section on the line 9—9 of Fig. 7.

Fig. 10 is a perspective view of the material agitating and ejecting members, removed from the freezing chamber.

Referring to the drawings, 1 indicates, as an entirety, a suitable support, including a bed or base $1^a$. The bed $1^a$ may be provided with a pair of spaced standards $1^b$ to which are preferably secured brackets or arms 2 extending from the opposite ends of a freezer, indicated as an entirety at 3. $3'$ indicates a batch holding tank, which may be located on top of the freezer 3. $3^a$ indicates a conduit connected with the batch tank and freezer 3; the conduit $3^a$ is adapted to convey the material from the batch tank to the freezer. The conduit may be provided with a suitable valve $3^b$. The freezer 3 comprises a cylinder 4, a rear head $4'$ and a front head 5, which form the freezing space or chamber. The front and rear heads are provided with bearings in which the shaft or shafts of material agitating and scraping members or elements 6 rotate. The bearing carried by the front head is indicated at $5'$. Its outer wall is provided with screw threads to fit a threaded opening formed in the head, as shown in Fig. 3. The agitating members 6 may be of any desired construction, but preferably include one or more devices $6^a$ which are arranged to propel the material toward the discharge end of the freezer in order to force the material therefrom when the discharge valve $5^a$ is opened. The material agitating and scraping members are operated in any well-known manner by suitable mechanism 7; by preference the scraping members are rotated in clock-wise direction when facing the front head of the freezer, for a purpose to be later described.

The freezer cylinder 4 may be surrounded by a jacket which preferably includes a cylinder 4$^a$; between the cylinders 4 and 4$^a$ may be provided a corrugated sheet 4$^{a\prime}$ to form a circuitous conduit for the refrigerant; while the space between the cylinders 4 and 4$^a$, and surrounding the corrugated sheet 4$^{a\prime}$ may be filled with some non-conductor of heat, such as ground cork, as shown at 4$^b$. At its front end, the freezer 3 is provided with an annulus 4$^c$ to which the outer or front ends of the cylinders 4 and 4$^a$ are secured. The refrigerant used is preferably brine, it being supplied to the conduit by a pipe 4$^d$, which is connected thereto at one side of the freezer 3.

4$^{c\prime}$ indicates a bearing ring, preferably formed integral with the annulus 4$^c$ and adapted to be engaged by a flange 5$^b$ carried by the front head 5. The flange 5$^b$ is preferably grooved to receive the ring 4$^{c\prime}$, these parts being accurately ground to form a liquid tight joint between the freezer cylinder 4 or the annulus therefor, and the head 5.

8 indicates devices for removably securing the head 5 to the annulus 4$^c$. These devices preferably comprise a plurality of arms 8$^a$, having inturned ends 8$^b$, secured to the annulus 4$^c$, and rotatable cams 8$^c$ carried by the head 5. The cams 8$^c$ are arranged to engage the under surfaces of the inturned ends 8$^b$, which co-act to press the head flange 5$^b$ against the ring 4$^{c\prime}$. Each cam 8$^c$ has a handle 8$^d$ by which it may be operated.

5$^c$ indicates a discharge opening formed in the lower portion of the head 5. This opening is preferably surrounded by a wall 5$^d$, which may serve as a short nozzle to direct the frozen material downwardly. The wall 5$^d$ is preferably formed integral with the head 5 and its outer end edge serves as a seat for the valve 5$^a$. The valve 5$^a$ is preferably pivoted on a shaft 5$^e$. 5$^f$ indicates a stop which limits the movement of the valve when it is opened.

9 indicates a duct leading to an opening 9$^\prime$ formed in the upper portion of the freezer front head 5, the walls of the duct and head being preferably formed integral. The center of the opening 9$^\prime$ is preferably disposed in a vertical plane which cuts the axis of the freezer. The duct 9 extends vertically upwardly from the opening 9$^\prime$. The opening 9$^\prime$ is preferably elongated in a vertical direction, as shown in Fig. 7. In the present disclosure of an ice cream freezing apparatus, the opening 9$^\prime$ is shown as an inspection opening; and when so used I may provide the upper end of the duct with a closing cap 9$^a$. The cap may be pivotally connected to the wall of the duct, as shown in Fig. 3. The cap 9$^a$ is held to its seat, when closed, by engagement with a lip 9$^b$ formed integrally on the head 5. One function of the duct 9 is to permit the escape of air from the freezer during filling, the cap 9$^a$ being opened for this purpose. Another function of the duct 9 is to permit from time to time inspection of the material being frozen within the freezing cylinder to determine its condition.

12 indicates a separate duct leading to an opening 12$^\prime$ formed in the front freezer head 5, the walls of the duct 12 and head 5 being preferably formed integral. The opening 12$^\prime$ in the head 5 is preferably arranged at that side of the axis of the freezer, relative to which the arms 6$^b$ of the scraping members 6, when rotating, move downwardly. As already described herein, the scraping members 6 move in a clockwise direction when looking at the freezer front head; accordingly, the opening 12$^\prime$ is arranged at the right of the axis of the agitating members 6 and the duct 9, as viewed in Fig. 2. The inlet opening 12$^\prime$ preferably extends vertically from a point below a horizontal line cutting the axis of the freezer to a point near the perimeter of the head 5, so that the fruit will engage with the scrapers and scraper arms as soon as the latter commence to move downwardly in rotating about their axes. The duct 12 preferably extends upwardly to a point above the duct 9 and above the upper edge of the freezer 3. The duct 12 preferably extends upwardly parallel to the duct 9. The inner wall of the duct 12 is preferably ground to form a seat for the lower end of an inlet and funnel member 13. The inlet and funnel member 13 preferably extend upwardly to a point in the plane of the upper edge of the batch tank 3$^\prime$.

The duct 12, opening 12$^\prime$ and inlet member 13 provide means for introducing fruit or flavoring material, either or both, directly into the freezing chamber. Owing to the disposition of the opening 12$^\prime$ relative to the axis of the agitating and scraping members, as above described, I am enabled to discharge the fruit or flavoring material into the freezing chamber at a point relative to which the scrapers and the arms thereof are moving downwardly, so that the fruit or flavoring material will be drawn downwardly and inwardly into the freezing chamber where it is caught by the agitating members rotating in a direction opposite to the scraping members and at once thoroughly mixed with the material being frozen. This construction of freezer front head is advantageous in that it provides for the introduction independently of the material delivered from the batch tank 3$^\prime$, of the fruit or other flavoring material to the freezing chamber; this form of construction also permits the fruit to be discharged into the freezer at any time while the freezing operation is going on, so that a thorough and uniform mixing of the fruit with the material within the freezer is quickly effected. While the inlet opening 12' could be arranged at some other point about the axis of the freezer, I prefer to arrange it as disclosed in the drawings, as the gravitation of the fruit as well as the direction of movement of the arms will quickly effect delivery of the fruit through the opening 12' into the freezing chamber.

In operating the freezer, the required amount of material is discharged from the batch tank 3', through the conduit 3ª into the cylinder 4, and the agitating and scraping members 6 are then rotated in the usual manner to freeze the material. Due to the operation of the material agitating and scraping members and their co-operation with the walls of the opening 9' and duct 9, different portions of the material in the freezer are continually forced into and out of the opening and duct or past the point of vision directly below the opening into the duct 9, whereby the material can be conveniently inspected. As a result of this operation the operative is enabled to view different portions of the material and to thereby intelligently determine when to discharge the batch.

When it is desired to introduce fruit or other flavoring material into the freezer, the top 13ª which is preferably provided for the funnel 13 is removed and such material is poured into the funnel 13, through which and the duct 12 and opening 12' it flows to the freezer.

It is well known that in making ice cream it is desirable to prevent breaking, cutting up or mutilating of the fruit, so that when the cream is served the fruit therein will be in its natural condition and form. In my invention I am enabled to introduce the fruit into the freezer just prior to the time the batch is discharged therefrom, so that it will not be cut up or crushed by the operation of the agitating, stirring and scraping members; at the same time, by disposing the opening 12' at one side of the axis of the freezer, as above described, I am enabled to readily introduce the fruit into the freezer and quickly and uniformly mix it with the frozen material therein, so that the batch can be quickly discharged thereafter. Again, by providing means for the separate introduction of the fruit, I am enabled to more readily and effectively whip up and freeze the material to be frozen.

From the foregoing description, it will be seen that the freezing apparatus may be filled with fruit or other flavoring material and discharged through the same—the front—head and that I have provided in said head a duct 9 through which the material may be observed; in other words, that I have provided the head with three ducts, an outlet or discharge opening in its lower portion, an inspection opening in its upper portion, and an inlet opening at one side of a vertical line cutting the axis of the freezer.

I prefer to arrange the duct 9 so that its major axis is disposed in a vertical plane cutting the longitudinal axis of the freezer; and also to arrange the duct 12 parallel to the duct 9 and at that side thereof relative to which the scrapers move downwardly. I have found by this arrangement that the agitating members 6 in co-operation with the walls of the opening 12' will most effectively cause the material introduced through the duct 12 to flow into the freezing chamber and readily and quickly become properly mixed therein.

To those skilled in the art of making mechanism of the class described, many alterations in construction and widely differing embodiments of my invention will suggest themselves, without departing from the spirit and scope thereof. My descriptions and disclosures herein are purely illustrative and are not intended to be in any sense limiting.

What I claim is:

1. In apparatus of the class described, the combination of a horizontal freezing cylinder, agitating members rotatably mounted in said cylinder, and means for introducing materials into said cylinder at that side of its axis relative to which said agitating members move downwardly and at a point which is approximately in a horizontal plane cutting that axis.

2. In apparatus of the class described, the combination of a freezing cylinder having a head, agitating members rotatably mounted in said cylinder, and means for introducing materials through said head into said cylinder at that side of its axis relative to which said agitating members move downwardly as they rotate and substantially at a point which is in a horizontal plane cutting the said axis.

3. In apparatus of the class described, the combination of a freezing cylinder having a head, and agitating members rotatably mounted therein, said head being formed at that side of the axis relative to which said agitating members move downwardly with an opening extending from a point above that axis to a point therebelow.

4. In an ice cream freezing apparatus, the combination of a freezing cylinder having a head at one end, mechanism movably mounted in said cylinder and operating to agitate the material therein, said head being formed with two openings one of which is disposed at one side of the vertical plane cutting the axis of said cylinder and arranged below the other opening and also formed in its lower portion with a discharge opening having a valve to control the discharge of the material from said cylinder, and means for operating said agitating mechanism.

5. In an apparatus of the class described, the combination of a freezing cylinder having a head at one end, agitating mechanism in said cylinder, said head being formed with two openings each provided with a duct, one of said openings being disposed at one side of the vertical plane cutting the axis of said cylinder and arranged below the other opening, and the duct therefor extending to a point above the duct for the other opening.

6. In apparatus of the class described, the combination of a freezing cylinder having at one end a head formed with two openings, agitating mechanism rotatably mounted in said cylinder, means for closing one of said openings, the other opening being disposed at that side of the vertical plane cutting the axis of said cylinder relative to which said agitating mechanism moves as it rotates, and a duct leading upwardly from said last-mentioned opening.

7. A head for a freezing cylinder having an inlet opening disposed at one side of the vertical plane cutting the axis of the head and extending from a point above that axis to a point therebelow.

8. In an ice cream freezing apparatus, the combination of a freezing cylinder having a head at one end thereof, members rotatably mounted in said cylinder for agitating the material therein, said head being formed, on that side thereof relative to which the adjacent supporting arms of the material agitating members move downwardly when rotating, with a material inlet opening whereby materials introduced into said cylinder will be engaged by said members, carried into the cylinder and mixed with the cream being frozen therein, a duct leading to said opening, and means for rotating said agitating members.

9. In an ice cream freezing apparatus, the combination of a freezing cylinder having a head at one end thereof, members rotatably mounted in said cylinder for agitating the material therein, said head being formed, on that side thereof relative to which the supporting arms of the material agitating members adjacent thereto move downwardly when rotating, with an elongated material inlet opening, a duct leading to said opening, and means for rotating said agitating members.

10. In an ice cream freezing apparatus, the combination of a freezing cylinder having a head at one end thereof, members rotatably mounted in said cylinder for agitating the material therein, said head being formed, on that side thereof relative to which the supporting arms of the material agitating members adjacent thereto move downwardly when rotating, with a material inlet opening, elongated in a vertical direction, a duct leading to said opening, and means for rotating said agitating members.

11. In an ice cream freezing apparatus, the combination of a freezing cylinder having a head at one end thereof, members rotatably mounted in said cylinder for agitating the material therein, said head being formed with two openings, one above and in the vertical plane cutting the axis of said cylinder and the other on that side of the axis of the cylinder relative to which the supporting arms of the material agitating members adjacent thereto move downwardly when rotating, a duct leading to each of said openings, and means for rotating said agitating members.

12. In an ice cream freezer, the combination of a horizontal freezing cylinder having a head at one end thereof, material agitating members rotatably mounted in said cylinder, said head being formed with an opening above its axis and a material discharge opening below its axis, and means for introducing material into said cylinder at a point between said openings and on that side of the axis of said cylinder relative to which said agitating members move downwardly.

13. In an ice cream freezer, the combination of a horizontal freezing cylinder having at one end thereof a head formed with a material discharge opening, and agitating members rotatably mounted in said cylinder, said head being formed with a material inlet opening on that side of the axis of said cylinder relative to which said agitating members move downwardly and extending from a point adjacent the periphery of said head downwardly to a point approximately in a horizontal plane cutting that axis.

14. In an ice cream freezing apparatus, the combination of a freezing cylinder having a head at one end thereof, members rotatably mounted in said cylinder for agitating the material therein, said head being formed with an inspection opening and a material inlet opening, the inspection opening being arranged above and in the vertical plane cutting the axis of said cylinder and the inlet opening being arranged at one side of said inspection opening, a duct leading to each of said openings, and means for rotating said agitating members.

15. In an ice cream freezing apparatus, the combination of a freezing cylinder having a head at one end thereof, members rotatably mounted in said cylinder for agitating the material therein, said head being formed with an inspection opening and a material inlet opening, the inspection opening being arranged above and in the vertical plane cutting the axis of said cylinder and the inlet opening being arranged at one side of said inspection opening, a duct leading to each of said openings, said head also being formed with a discharge opening in its lower portion, and means for rotating said agitating members.

16. A head for a freezing cylinder formed with three openings, one of said openings serving as an inspection opening and arranged in the upper portion of the head, another of said openings serving as a discharge opening and arranged in the lower portion of said head and the other of said openings serving as a material inlet opening and arranged at one side of a vertical plane cutting the axis of said head, and a duct connected to said inlet opening.

17. The combination of a horizontal cylinder provided with a head at one end having a discharge opening in its lower portion, said head being formed with a material inlet opening at one side of a vertical plane cutting the axis of said cylinder, and material agitating and scraping members rotatably mounted within said cylinder.

18. In an ice cream freezer, the combination of a cylinder having heads at opposite ends, and agitating means within said cylinder, one of said heads having a material inlet opening and the other of said heads having a discharge opening in its lower portion, an inspection opening and a material inlet opening, disposed at one side of the axis of said cylinder.

In testimony whereof I affix my signature.

LEROY S. PFOUTS.

Witness:
Geo. B. Pitts.